T. T. PROSSER.
CUTTING SCREWS.

No. 103,776. Patented May 31, 1870.

WITNESSES
A. Ruppert.
C. F. Clausen

INVENTOR
T. T. Prosser

T. T. PROSSER.
CUTTING SCREWS.

No. 103,776. Patented May 31, 1870.

WITNESSES
A. Ruppert.
C. F. Clausen.

T. T. Prosser
INVENTOR
by
D. S. Hollowayler
his atty

United States Patent Office.

TREAT T. PROSSER, OF CHICAGO, ILLINOIS.

Letters Patent No. 103,776, dated May 31, 1870.

IMPROVED SCREW-THREADING MACHINE.

The Schedule referred to in these Letters Patent and making part of the same

To all whom it may concern:

Be it known that I, TREAT T. PROSSER, of Chicago, in the county of Cook and State of Illinois, have invented a new and useful Improvement in Screw-forming Machines; and I do hereby declare that the following is a full, clear, and exact description thereof, reference being had to the annexed drawing making part of this specification, in which—

Corresponding letters refer to corresponding parts in the several figures.

Figure 1:
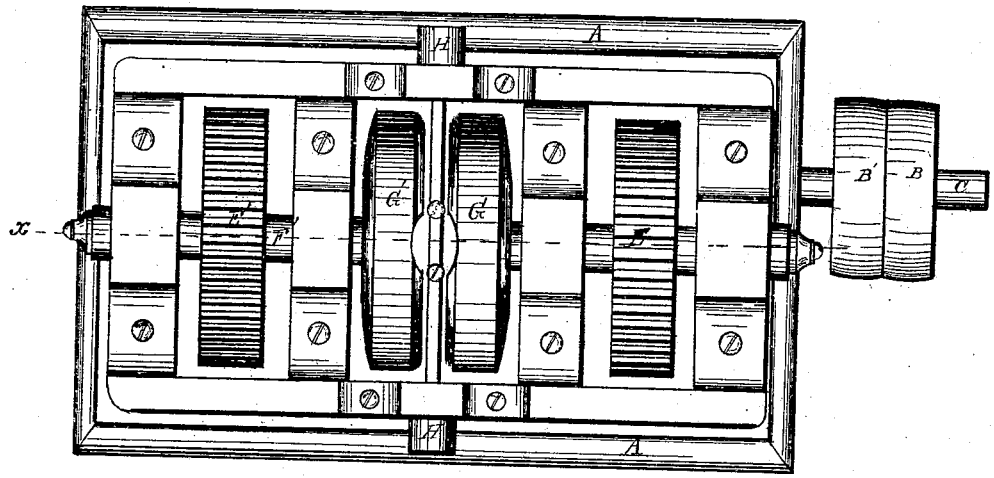
Figure 1 is a plan or top view of the machine, showing the frame, the driving-pulleys, the gear-wheels upon the shafts to which the disks are secured, the thread-forming disks, and the graduated guide for the bolts to be threaded.
Figure 2:
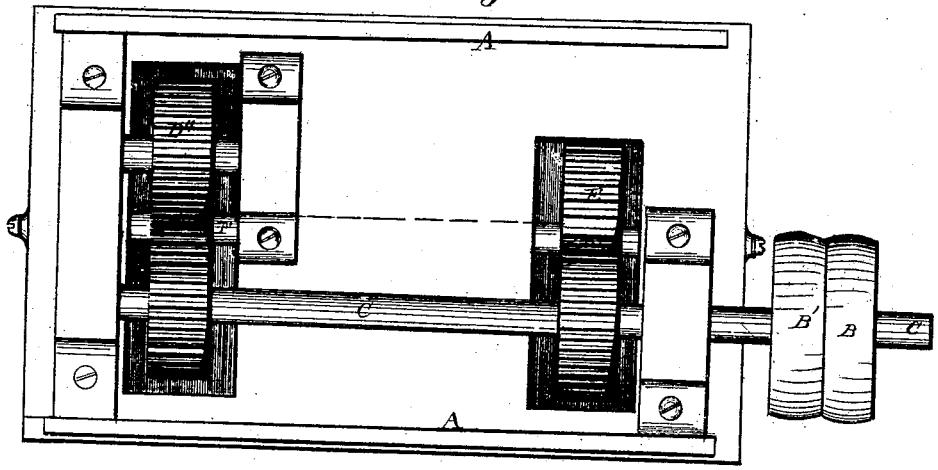
Figure 2 is a bottom view, showing the driving-pulleys with their shaft, and the arrangement of the driving-gears.

This invention relates to that class of machines which is designed for threading bolts or forming screws upon rods of metal, whether such bolts or rods are heated, for the purpose of facilitating the operation, or are cold, as in the usual method; and It is designed as an improvement upon a machine for which Letters Patent were granted to me on the 29th of June, A. D. 1869.

To this end the invention consists in the construction, combination, and arrangement of certain parts of the machine, the object being to facilitate the threading of bolts or rods by providing the means for threading two or more at the same time, and dispensing with the necessity of shifting the dies at each operation, as in the said former machine.

To enable those skilled in the art to make and use my invention, I will proceed to describe its construction and operation.

A in the drawing represents the frame of the machine, which may be of the form shown in the drawing, or it may be of any other form of construction suitable to receive and sustain the parts which are attached thereto.

B represents a loose pulley, over which the driving-belt passes when the machine is to be stopped for any purpose. It is to be placed upon the driving-shaft C, and by the side of the pulley B', which is to be secured to such shaft, so that, when the belt is placed upon such pulley, the moving parts of the machine will be put in motion.

C represents the driving-shaft above referred to, which is to be secured in suitable bearings formed upon or attached to the main frame, through one end of which it passes, for the purpose of enabling it to receive upon its outer end the driving-pulleys.

D D' represent gear-wheels, which are to be firmly secured upon the driving-shaft C, in such positions as to bring them in line vertically with the wheels E E'.

D" represents a gear-wheel, which is to be secured to a countershaft which has its bearings in the main frame, or in hangers attached thereto. This intermediate wheel receives its motion from the wheel D', its office being to give the large wheel into which it meshes a motion in the opposite direction from that given to the wheel E, which is driven by the wheel D upon the driving-shaft.

E represents a gear-wheel, which may be of any diameter required to give the requisite motion to the shaft F, upon which it is firmly secured, so as to cause said shaft to rotate with it. This wheel is caused to rotate by the wheel D, and, consequently, its periphery at the point of contact will move in the same direction as does the periphery of said wheel.

E' represents another gear-wheel of the same dimensions as the wheel E, and secured upon the shaft F'. This wheel receives its motion from the intermediate wheel D", and as such wheel is driven by the wheel D', secured to the same shaft, and, consequently, revolving in the same direction as the wheel D, it follows that the wheel E' will be rotated in a direction opposite to the one in which the wheel E is moving, the object of which arrangement will soon be explained.

F represents a shaft, which is to be arranged in suitable bearings, which are attached to the main frame. Its position is to be parallel to that of the driving-shaft, so that the wheel E, which is secured thereto, shall mesh into and be driven by the wheel D upon such driving-shaft. The outer end of this shaft rests in a bearing having a socket upon its outer end, through the cap of which there is inserted a set-screw, which bears against the end of said shaft, so that, in the event of any wearing away of the parts, or in the event of its becoming necessary to change the machine, to thread different-sized bolts, it can be done by the movements of this set-screw.

F' represents another shaft, in all respects like the above-described one in its construction, it having the wheel E' secured to it, and it being also provided with a set-screw upon its outer end. The axes of these shafts horizontally are parallel to each other, but it will be seen that vertically they are not the same, that of the one marked F' being somewhat above that of F. The object of this arrangement is to cause a longitudinal as well as rotary movement of the bolt or rod while being threaded, it being apparent that, without such movement, no thread could be formed, as in the event of a rotary movement only of the bolt there would be formed grooves or channels around such bolt, but they would not be in the form of screw-threads.

In arranging these shafts with reference to the above-described result, care should be taken to have one of them as much above a line drawn through the center of the guide H as the other is below such line.

Figure 3:
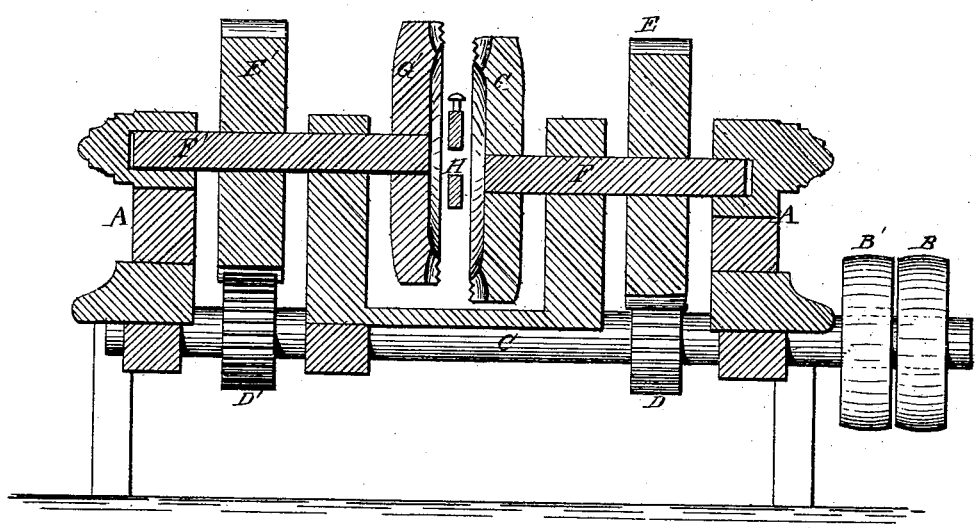
Figure 3 is a vertical central section on line $x\,x$ of fig. 1, showing the arrangement of the guide, with reference to the threading-disks.
Figure 5:
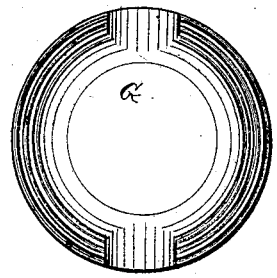
Figure 5 is a face view of one of the threading-disks, showing the recesses in its face.

G G' represent the thread-forming disks, which are to be secured to the inner ends of the shafts F F'. Being thus secured, it follows that their thread-forming surfaces will be one as much above and the other as much below the center of the guide H as are the centers of the shafts upon which they are mounted. The general outline of these disks may be such as is shown in fig. 1, or it may be any other that will give the overhanging projection in which to form the annular grooves shown in figs. 3 and 5. These grooves in different disks are to be of different sizes, varying according to the number of threads to the inch, and the dimensions of the bolt to be threaded. It being apparent that the projections which alternate with the grooves are what forms the thread upon the bolt, it follows that they should be of the same angles and sizes as the grooves. In figs. 1, 3, and 5, these disks are shown as having recesses formed in their faces directly opposite to each other. These recesses are of such depth as to remove all of the grooves and projections where they are cut.

This feature in the construction of these disks forms an important part of my improvement, and constitutes an essential difference between the present devices and the one above referred to, as by it I am enabled to cut two or more bolts at one and the same time.

It will be seen that the recesses are opposite to each other at the exact time when they are opposite the guide H, so that, by thrusting a bolt in through such recesses at that time, the grooved portions of the disks will, on coming in contact therewith, thread such bolt and cause it to recede out of such guide, thus leaving it in condition to receive another blank.

This arrangement necessitates the constructing of the thread-forming disks of such diameter that the desired length of thread may be formed while the disks are performing about one-fourth of a revolution.

Figure 4:
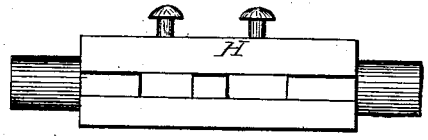
Figure 4 is a side elevation of the guide, showing the arrangement of the stops for regulating the length of the threads.

H represents a guide, which is to be placed between the threading-disks, it being constructed as shown in fig. 4, and resting in bearings formed in the frame of the machine. Its journals are hollow, which admits of the bolts being passed through them. That portion of this guide which is within the frame has a slot or groove formed in it, which allows the portions of the bolt which protrude through to come in contact with the disks, and thus be rotated and threaded.

The slotted portion of this guide is provided with stops held in position by set-screws, as shown in fig. 4, so that they may be set in any desired position, and thus the length of the thread upon each bolt can be determined.

Having thus described my invention,

What I claim, and desire to secure by Letters Patent, is—

1. The improved disks, constructed substantially as set forth, having recesses cut transversely across their thread-forming faces, substantially as and for the purpose set forth.

2. Said improved disks G G', constructed substantially as described, arranged to revolve in parallel planes, upon shafts set in different horizontal planes, substantially as set forth.

3. The arrangement of the said improved disks G G', in relation to one another, and also to the guides H H, substantially as and for the purpose set forth.

In testimony whereof I have signed my name to this specification in the presence of two subscribing witnesses.

TREAT T. PROSSER.

Witnesses:
P. A. HOYNE,
A. P. SHERMAN.